Patented Feb. 8, 1938

2,107,321

UNITED STATES PATENT OFFICE 2,107,321

ORGANIC MERCURY COMPOUNDS

Carl N. Andersen, Watertown, Mass., assignor to Lever Brothers Company, a corporation of Maine No Drawing. Application January 21, 1935, Serial No. 2,758

13 Claims. (Cl. 260—13)

The present invention relates to the production of certain new organic mercury compounds, particularly aromatic mercury substituted pyrazoles and pyrazolones.

It is the object of my invention to produce new organic mercury compounds useful as germicides and for other therapeutic purposes.

More particularly, it is an object of my invention to prepare certain new organic mercury compounds which may be regarded as substituted derivatives of members of the pyrazole group, particularly the pyrazolones.

I have discovered that when certain aromatic mercury compounds are reacted with substituted derivatives of members of the pyrazole group, compounds are produced which have extraordinarily high potency as antiseptics and germicides and at the same time are characterized by relatively low toxicity and other desirable properties.

The above mentioned aromatic mercury compounds contain the essential radical RHg—, in which R represents an aromatic structure to a carbon atom of which the mercury is directly attached, and may be an aromatic nucleus with or without side chains. The expression "aromatic structure" used herein is intended to be generic and includes an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl and naphthyl groups.

The members of the pyrazole group, which will here be referred to generally as pyrazoles, and any one of which may be regarded as a pyrazole, are:

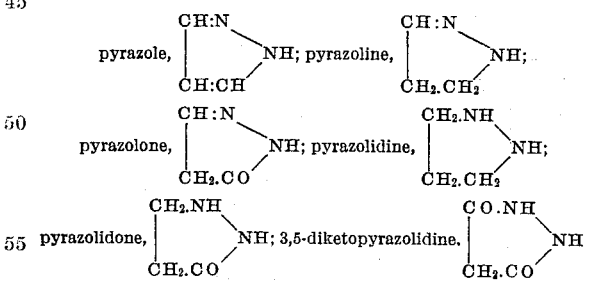

The above listed compounds are heterocyclic imides. The aromatic mercury derivatives of these imides are disclosed and claimed in my application Serial No. 754,374, filed November 22, 1934.

The compounds comprising the substituted members of the pyrazoles, the aromatic mercury derivatives of which constitute my invention, are those in which at least the hydrogen atom attached to the nitrogen atom or atoms in the ring, and in some cases also the hydrogen atom or atoms attached to one or more of the carbon atoms in the ring, has been replaced by any monovalent radical except an acidic group, for example the carboxyl group. The radicals usually substituted are neutral (i. e. non-acidic) such as the alkyl and aromatic.

The aromatic mercury derivatives of the heterocyclic compounds in which a carboxyl group is attached to one or more ring elements are disclosed and claimed in my application Serial No. 967, filed January 9, 1935.

Examples of substituted pyrazoles of the above defined type are:

1,3-dimethyl pyrazole
1,3,5-triphenyl pyrazoline
1-phenyl, 2-methyl pyrazolidine
1,2,3-phenyldimethyl pyrazolidone Further examples of the substituted pyrazoles, and ones that I have found to be useful in producing particularly interesting aromatic mercury compounds are the substituted pyrazolones. Examples of these compounds are:

1-phenyl 2,3-dimethyl 4-dimethylamino pyrazolone-5 (pyramidon)
1-phenyl 3-methyl pyrazolone-5
1-phenyl 3-methyl 4-nitro pyrazolone-5 (picrolonic acid)
1-phenyl 2,3-dimethyl pyrazolone-5 (antipyrene)
Tartrazine, Schultz #737; "Colour Index" #640

The preparation of these compounds leads me to believe that all the members of this group react in the same manner and can be employed to produce my novel mercury compounds. The compounds so prepared have, in greater or lesser, but always in relatively high degree, desirable antiseptic and germicidal properties. I therefore regard my invention as generic to and including this entire group of substituted pyrazoles.

The general method of preparing these compounds consists in reacting together the substituted pyrazole and a compound containing the aromatic mercury radical of the above mentioned type. A common solvent for both reacting components is employed. The compound resulting from the reaction is usually relatively insoluble as compared with the reacting components and upon its precipitation may be filtered, washed and dried. If the compound formed is relatively soluble, the solution may be concentrated and the compound will crystallize out.

The chemistry of the pyrazoles and pyrazolones is very complex and sufficient data are not available for a complete understanding of their structure and chemical properties under all conditions. The difficulty in studying these compounds and their derivatives may be accounted for in part by the ionic migration and the internal rearrangement of the atoms in the molecule under different conditions, a phenomenon which is characteristic of these compounds.

From my present investigations I am unable to state the mechanism of the reaction which I have employed to produce my novel mercury compounds or to assign a definite structural formula to the compounds produced. I am, however, certain that the aromatic mercury radical or compound is combined in some manner with the substituted pyrazole, because the melting points and the germicidal values of the compounds produced are different from those of the reacting materials. However, having disclosed my invention and the novel compounds so that they may be produced by one skilled in the art, I prefer not to speculate in assigning any definite formulae to the compounds produced or in stating in what position or how the aromatic mercury radical or compound is attached to the substituted pyrazole compound.

The compounds produced will depend in some instances on the particular aromatic mercury compound employed as the initial reacting material, and in some instances on the solvent employed. When an aromatic mercury hydroxide is used as the reacting material I am inclined to believe that it is the aromatic mercury radical thereof that is introduced into the compound. This does not exclude the possibility that the hydroxyl radical is also introduced. When a soluble salt such as the acetate is employed as the reacting material, I am inclined to believe that an addition product of some type is formed. When the same substituted pyrazole is treated with the hydroxide and also with a soluble salt, compounds result which have different melting points. When water is employed as the solvent, in some instances two compounds having different melting points may be produced. When alcohol is employed as a solvent, a compound results which has a different melting point than the compound obtained when water is employed as the solvent. These phenomena may be accounted for by the fact that under different conditions the aromatic mercury radical, or the aromatic mercury compound, will become attached at different positions in the substituted pyrazole, or the arrangement of the atoms of the molecule itself may vary under different conditions. Some of the compounds I have prepared change in their properties, particularly their germicidal value, after standing for some time. This also may be accounted for by the tendency of compounds of this type to undergo inter-molecular rearrangements.

The following examples are given as illustrative of a method by which all of the compounds of this group may be prepared and as illustrative of representative aromatic mercury compounds within the scope of my invention:

Example 1

17.64 grams of phenylmercury hydroxide is dissolved in 4 liters of water and heated until the solution is complete. The solution is then filtered to remove any insoluble material. To the filtrate is added 14.32 grams of pyramidon (1-phenyl 2,3-dimethyl 4-dimethylamino pyrazolone-5). No precipitate results at first but on concentration of the solution crystals separate. These are separated by filtration, washed and dried. They melt at 145–155° C. Upon further concentration of the mother liquor, another crop of crystals separate which melt at 170–172° C. The compounds are phenylmercury derivatives of pyramidon.

Example 2

17.64 grams of phenylmercury hydroxide is dissolved in 2 liters of water and heated until the solution is complete. The solution is then filtered to remove any insoluble material. 11.48 grams of 1-phenyl 3-methyl pyrazolone-5 is dissolved in 200 cc. of 75% ethyl alcohol. These two solutions are brought together by pouring them into a third container. A white amorphous solid results which is separated by filtration, washed well with warm water and alcohol and dried. The material melts at 99–105° C. When the procedure is duplicated in aqueous solution a compound results which decomposes at 220° C. Upon recrystallization it melts at 226° C. The compounds are the phenyl-mercury derivatives of 1-phenyl 3-methyl pyrazolone-5.

When phenylmercury acetate is substituted for the hydroxide an amorphous material melting at 225½° C. is obtained. This compound is believed to be a phenylmercury acetate addition product of 1-phenyl 3-methyl pyrazolone-5.

Example 3

17.64 grams of phenylmercury hydroxide is dissolved in 4 liters of water and heated until the solution is complete. The solution is then filtered to remove any insoluble material. To the filtrate is added an aqueous solution containing 12.40 grams of antipyrene (1-phenyl 2,3-dimethyl pyrazolone-5). A precipitate results and after the mixture is allowed to stand it is filtered. The precipitate is washed well with warm water and dried. It decomposes at 215° C. The compound is the phenylmercury derivative of antipyrene.

When phenylmercury acetate is allowed to react with antipyrene a white insoluble material forms which melts at 227.5° C. This compound is believed to be a phenylmercury acetate addition product of antipyrene.

Example 4

11.66 grams of phenylmercury hydroxide is dissolved in 4 liters of water and heated until the solution is complete. The solution is filtered to remove any insoluble material. To the filtrate is added 10.56 grams of picrolonic acid (1-phenyl 3-methyl 4-nitro pyrazolone-5) dissolved in 600 cc. of alcohol. A yellow precipitate forms and at the same time vile odors are evident. The mixture is allowed to cool, after which it is filtered and the precipitate washed well with warm water and dried. It softens at 205° C. and decomposes above this temperature. The compound is phenylmercury picrolonate.

All of the other substituted pyrazoles of this type may be treated in a manner similar to the above examples to form corresponding aromatic mercury derivatives. From the specific examples given it will be obvious to one skilled in the art what procedure is to be followed in producing these other compounds. Theoretical quantities of reacting materials are generally employed. In some cases, if desired, approximately 10% excess of the substituted pyrazole may be employed in order to insure complete conversion of the aromatic mercury compound.

The operativeness of the process is not found to depend in any degree upon the temperature at which the reaction is effected. It is convenient to use heat because it facilitates the solution of the reacting components and speeds the reaction, but the process can be carried out at any temperature, for example, room temperature. Similarly, the process may be carried out in any mutual solvent. Water is usually employed for reasons of convenience when both reacting components are water-soluble, but if not, other solvents, such as the alcohols or acetone or mixtures of these with each other or with water may be employed. A difference in solvent and temperature does not affect the operativeness of the process but may affect the product that is formed. However, as all these compounds possess germicidal properties I regard them as within the scope of my invention.

All of the compounds produced as above described are characterized by extraordinarily high potency as germicides. Tests to determine the efficacy of certain of them in killing *B. typhosus* and *Staph. aureus* were carried on under the following conditions:

Aqueous solutions of varying dilutions from 1–10,000 upward until killing ceased, were made up.

These dilutions were employed in the conduct of the tests by the following methods:

Circular 198, U. S. Dept. of Agriculture Dec. 1931, described as F. D. A. Method against *Eberthella typhi* (typhoid bacillus) at 37° C. and F. D. A. Special method against *Staph. aureus* at 37° C.

As illustrative of the potency of the compounds, the killing power of the following compounds is given merely as illustrative:

The figures represent the maximum dilutions at which killing in 15 minutes resulted:

|  | B. typhosus | Staph. aureus |
|---|---|---|
| Phenylmercury 1-phenyl 3-methyl pyrazolone-5 | 1:372,000 | 1:372,000 |
| In alcohol | 1:100,000 | 1:45,000 |
| Phenylmercury 1-phenyl 2,3-dimethyl pyrazolone-5 | 1:288,000 | 1:252,000 |
| In alcohol | 1:70,000 | 1:40,000 |
| Phenylmercury picrolonate (in acetone) | 1:80,000 | 1:40,000 |

In addition to their high germicidal value, all of these compounds are characterized by relatively low toxicity. Because of these properties it is possible to use them in extreme dilutions and in many situations where known germicides, because of toxic or other undesired properties, can not be employed. They may be used externally and locally, and in some cases administered internally with satisfactory results from the germicidal standpoint and without harmful effect to the body or its functions.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. An aromatic mercury substituted pyrazole in which the radical RHg— is linked to a substituted pyrazole, where R represents an aromatic structure to the carbon atom of which the mercury is directly attached and in which none of the carbon atoms has direct linkage with any element other than hydrogen, carbon and mercury, and where the substituted pyrazole has any hydrogen attached to nitrogen replaced by a monovalent hydrocarbon radical.

2. An aromatic mercury substituted pyrazolone in which the radical RHg— is linked to a substituted pyrazolone, where R represents an aromatic structure to the carbon atom of which the mercury is directly attached and in which none of the carbon atoms has direct linkage with any element other than hydrogen, carbon and mercury, and where the substituted pyrazolone has at least the hydrogen attached to nitrogen replaced by a monovalent hydrocarbon radical.

3. An aromatic mercury substituted pyrazolone in which the radical RHg— is linked to a substituted pyrazolone, where R represents an aromatic structure to the carbon atom of which the mercury is directly attached and in which none of the carbon atoms has direct linkage with any element other than hydrogen, carbon and mercury, and where the substituted pyrazolone has the hydrogen atom attached to the nitrogen atom and a hydrogen atom attached to a carbon atom replaced by monovalent hydrocarbon radicals.

4. An aromatic mercury substituted pyrazolone in which the radical RHg— is linked to a substituted pyrazolone, where R represents an aromatic structure to the carbon atom of which the mercury is directly attached and in which none of the carbon atoms has direct linkage with any element other than hydrogen, carbon and mercury, and where the substituted pyrazolone has the hydrogen atom attached to the nitrogen atom and hydrogen atoms attached to a plurality of carbon atoms replaced by monovalent hydrocarbon radicals.

5. A phenylmercury substituted pyrazole in which the radical $C_6H_5Hg$— is linked to a substituted pyrazole and in which the substituted pyrazole has any hydrogen attached to nitrogen replaced by a monovalent hydrocarbon radical.

6. A phenylmercury substituted pyrazole in which the radical $C_6H_5Hg$— is linked to a substituted pyrazole and in which the substituted pyrazole has any hydrogen attached to nitrogen and a hydrogen attached to at least one of the carbon atoms replaced by a monovalent hydrocarbon radical.

7. A phenylmercury substituted pyrazole in which the radical $C_6H_5Hg$— is linked to a substituted pyrazole and in which the substituted pyrazole has any hydrogen attached to nitrogen and hydrogen atoms attached to a plurality of carbon atoms replaced by monovalent hydrocarbon radicals.

8. A phenylmercury substituted pyrazolone in which the radical $C_6H_5Hg$— is linked to a substituted pyrazolone and in which the substituted pyrazolone has at least the hydrogen atom attached to the nitrogen atom replaced by a monovalent hydrocarbon radical.

9. A phenylmercury substituted pyrazolone in which the radical $C_6H_5Hg$— is linked to a substituted pyrazolone and in which the substituted pyrazolone has the hydrogen atom attached to the nitrogen atom and a hydrogen atom attached to a carbon atom replaced by monovalent hydrocarbon radicals.

10. A phenylmercury subsituted pyrazolone in which the radical C₆H₅Hg— is linked to a substituted pyrazolone and in which the substituted pyrazolone has the hydrogen atom attached to the nitrogen and the hydrogen atoms attached to a plurality of carbon atoms replaced by monovalent hydrocarbon radicals.

11. A phenylmercury substituted pyrazolone in which the radical C₆H₅Hg— is linked to 1-phenyl 2,3-dimethyl 4-dimethylamino pyrazolone-5.

12. A phenylmercury substituted pyrazolone in which the radical C₆H₅Hg— is linked to 1-phenyl 3-methyl pyrazolone-5.

13. A phenylmercury substituted pyrazolone in which the radical C₆H₅Hg— is linked to 1-phenyl 2,3-dimethyl pyrazolone-5.

CARL N. ANDERSEN.